(12) United States Patent
Allam

(10) Patent No.: US 8,685,358 B2
(45) Date of Patent: Apr. 1, 2014

(54) PRODUCING AMMONIA USING ULTRAPURE, HIGH PRESSURE HYDROGEN

(75) Inventor: Rodney J. Allam, Chippenham (GB)

(73) Assignee: GTLpetrol LLC, New York, NY (US)

( * ) Notice: Subject to any disclaimer, the term of this patent is extended or adjusted under 35 U.S.C. 154(b) by 256 days.

(21) Appl. No.: 13/116,952

(22) Filed: May 26, 2011

(65) Prior Publication Data

US 2011/0318251 A1    Dec. 29, 2011

Related U.S. Application Data

(60) Provisional application No. 61/348,491, filed on May 26, 2010.

(51) Int. Cl.
*C01C 1/04* (2006.01)
*C01B 3/24* (2006.01)

(52) U.S. Cl.
USPC ............ 423/359; 423/650; 423/651; 423/652

(58) Field of Classification Search
USPC .......... 423/359, 360, 650, 651, 652, 653, 654
See application file for complete search history.

(56) References Cited

U.S. PATENT DOCUMENTS

| | | | | |
|---|---|---|---|---|
| 3,598,527 A * | 8/1971 | Quartulli et al. | ............. | 423/361 |
| 4,079,017 A * | 3/1978 | Crawford et al. | ............ | 48/198.3 |
| 4,296,085 A * | 10/1981 | Banquy | ......................... | 423/359 |
| 4,792,441 A * | 12/1988 | Wang et al. | ................... | 423/359 |
| 4,822,521 A * | 4/1989 | Fuderer | ......................... | 252/376 |
| 5,068,058 A * | 11/1991 | Bushinsky et al. | ........... | 252/376 |
| 6,534,551 B2 * | 3/2003 | Allam et al. | ................... | 518/700 |
| 6,669,744 B2 * | 12/2003 | Allam et al. | ................. | 48/127.9 |
| 7,094,384 B1 * | 8/2006 | Brandenburg | ................ | 423/359 |
| 7,553,475 B2 * | 6/2009 | Timpe et al. | .............. | 423/648.1 |
| 2002/0098132 A1 * | 7/2002 | Vidalin | ......................... | 422/188 |
| 2010/0047160 A1 | 2/2010 | Allam et al. | | |
| 2010/0068571 A1 * | 3/2010 | Collings et al. | ................. | 429/17 |
| 2011/0243828 A1 * | 10/2011 | Gordon | ......................... | 423/360 |

OTHER PUBLICATIONS

Patent Examination Report No. 1 issued in Australian Application No. 2011258160 on Dec. 12, 2013; 3 pages.

* cited by examiner

*Primary Examiner* — Wayne Langel
(74) *Attorney, Agent, or Firm* — Fish & Richardson P.C.

(57) ABSTRACT

In various implementations, feed streams that include ultrapure, high-pressure hydrogen streams and ultrapure, high-pressure nitrogen streams are reacted to produce ultrapure, high-pressure feed gas in a stoichiometric ratio to an ammonia synthesis reactor loop without or independent of including a methanol loop purge gas.

12 Claims, 17 Drawing Sheets

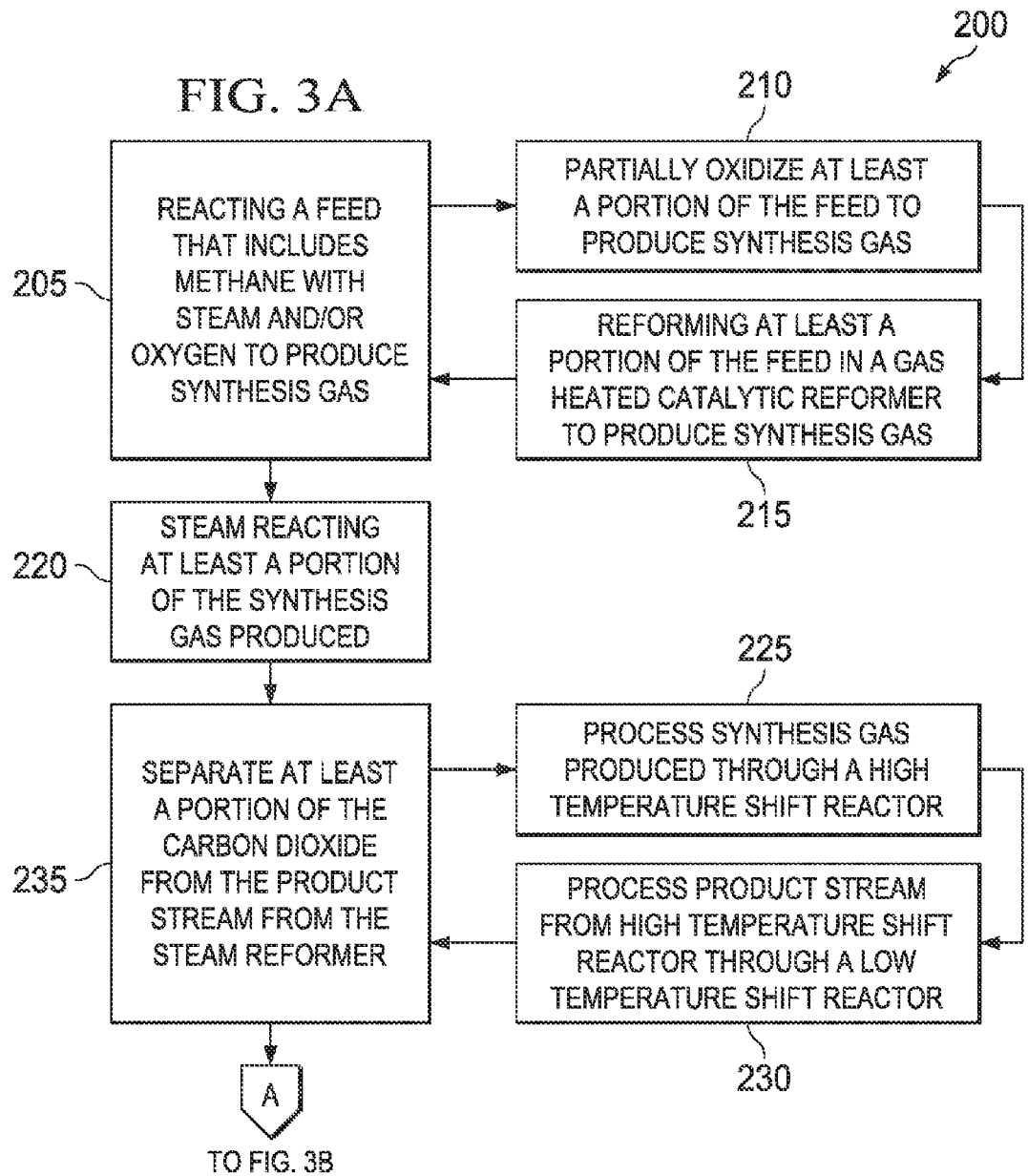

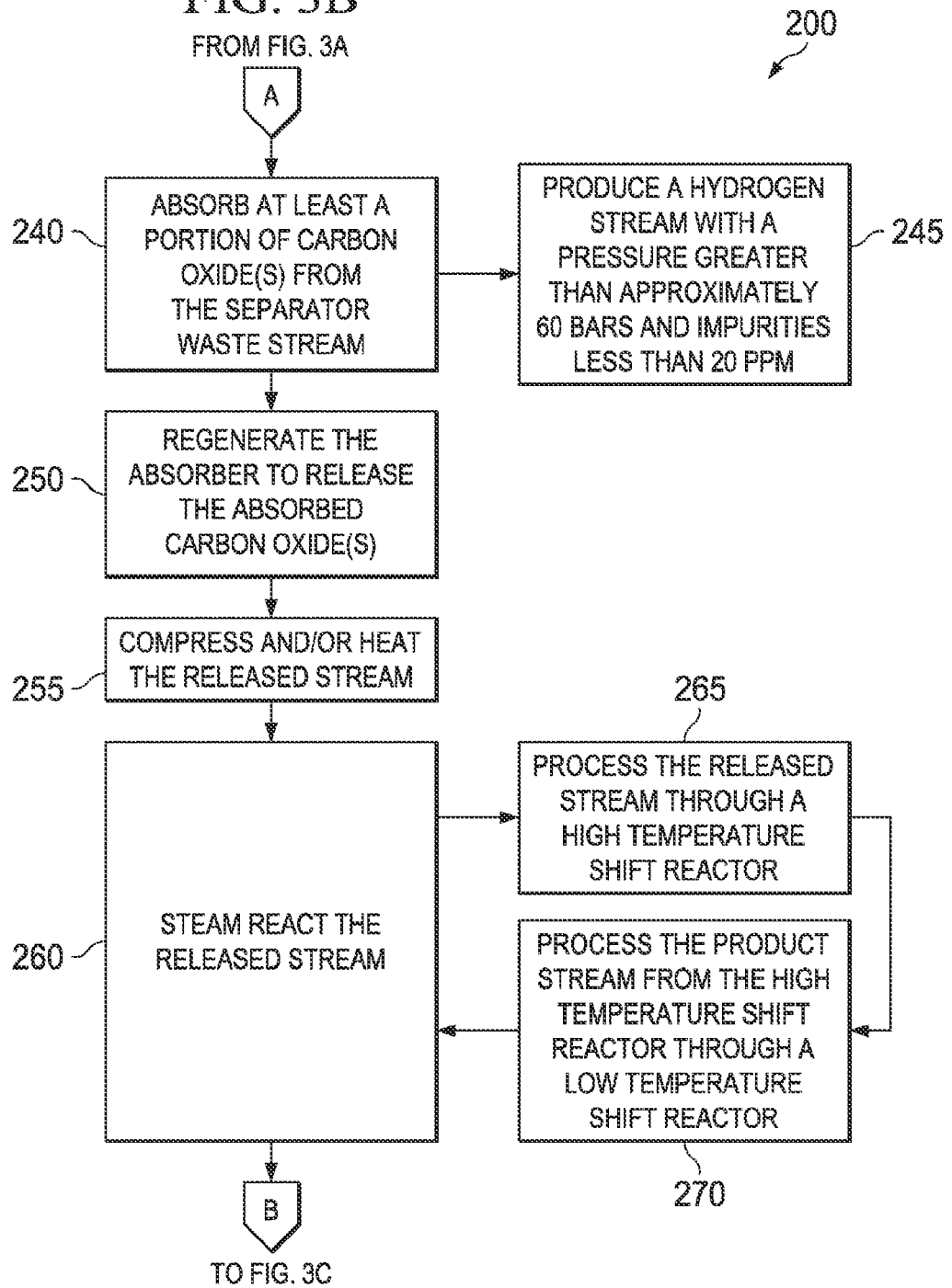

FIG. 5A

|  | 1 | 2 | 3 | 4 | 5 |
|---|---|---|---|---|---|
| lbmol/hr |  |  |  |  |  |
| CO | 0.00 | 0.00 | 0.00 | 1574.16 | 0.00 |
| $H_2$ | 0.00 | 0.00 | 0.00 | 2761.40 | 0.00 |
| $CO_2$ | 0.00 | 0.00 | 0.00 | 63.59 | 11.19 |
| $H_2O$ | 0.00 | 0.00 | 0.00 | 409.49 | 0.00 |
| $CH_4$ | 0.00 | 0.00 | 0.00 | 11.06 | 1492.67 |
| $O_2$ | 1044.23 | 1044.23 | 1044.23 | 0.00 | 0.00 |
| $N_2$ | 5.25 | 5.25 | 5.25 | 14.39 | 9.14 |
| Ar | 0.00 | 0.00 | 0.00 | 0.00 | 0.00 |
| $C_2$ | 0.00 | 0.00 | 0.00 | 0.00 | 49.79 |
| $C_3$ | 0.00 | 0.00 | 0.00 | 0.00 | 8.51 |
| $C_4$ | 0.00 | 0.00 | 0.00 | 0.00 | 1.58 |
| $C_5$ | 0.00 | 0.00 | 0.00 | 0.00 | 0.32 |
| $C_6$ | 0.00 | 0.00 | 0.00 | 0.00 | 0.63 |
| $C_7$ | 0.00 | 0.00 | 0.00 | 0.00 | 0.00 |
| TOTAL (lbmol/hr) | 1049.48 | 1049.48 | 1049.48 | 4834.09 | 1573.83 |
| TEMPERATURE (CELSIUS) | 30.00 | 35.00 | 270.00 | 1446.36 | 500.00 |
| PRESSURE (BARA) | 1.50 | 80.00 | 80.00 | 78.00 | 80.00 |
| VAPOUR FRACTION | 1.00 | 1.00 | 1.00 | 1.00 | 1.00 |
| LHV (Btu/scf) | 0.00 | 0.00 | 0.00 | 263.06 | 931.98 |
| CARBON (lbmol/hr) |  |  |  |  |  |

FIG. 5B

|  | 6 | 6A | 6B | 7 | 8 |
|---|---|---|---|---|---|
| lbmol/hr |  |  |  |  |  |
| CO | 0.00 | 232.14 | 1806.31 | 1806.31 | 1806.31 |
| $H_2$ | 0.00 | 1798.15 | 4559.56 | 4559.56 | 4559.56 |
| $CO_2$ | 4.28 | 287.58 | 351.18 | 351.18 | 351.18 |
| $H_2O$ | 3760.49 | 2961.74 | 3371.23 | 3371.23 | 3371.23 |
| $CH_4$ | 571.27 | 111.31 | 122.37 | 122.37 | 122.37 |
| $O_2$ | 0.00 | 0.00 | 0.00 | 0.00 | 0.00 |
| $N_2$ | 3.50 | 3.50 | 17.88 | 17.88 | 17.88 |
| Ar | 0.00 | 0.00 | 0.00 | 0.00 | 0.00 |
| $C_2$ | 19.06 | 0.00 | 0.00 | 0.00 | 0.00 |
| $C_3$ | 3.26 | 0.00 | 0.00 | 0.00 | 0.00 |
| $C_4$ | 0.60 | 0.00 | 0.00 | 0.00 | 0.00 |
| $C_5$ | 0.12 | 0.00 | 0.00 | 0.00 | 0.00 |
| $C_6$ | 0.24 | 0.00 | 0.00 | 0.00 | 0.00 |
| $C_7$ | 0.00 | 0.00 | 0.00 | 0.00 | 0.00 |
| TOTAL (lbmol/hr) | 4362.82 | 5394.42 | 10228.53 | 10228.53 | 10228.53 |
| TEMPERATURE (CELSIUS) | 494.38 | 900.00 | 1131.01 | 600.00 | 320.200 |
| PRESSURE (BARA) | 80.00 | 78.00 | 78.00 | 78.00 | 77.00 |
| VAPOUR FRACTION | 1.00 | 1.00 | 1.00 | .85 | 0.84 |
| LHV (Btu/scf) | 128.67 | 123.92 | 189.68 | 189.68 | 189.68 |
| CARBON (lbmol/hr) |  |  |  |  |  |

FIG. 5C

|  | 9 | 10 | 11 | 12 | 12A |
|---|---|---|---|---|---|
| lbmol/hr |  |  |  |  |  |
| CO | 600.18 | 600.18 | 105.18 | 105.18 | 105.18 |
| $H_2$ | 5765.68 | 5765.68 | 6260.68 | 6260.68 | 6260.68 |
| $CO_2$ | 1557.30 | 1557.30 | 2052.30 | 2052.30 | 2052.30 |
| $H_2O$ | 2165.10 | 2165.10 | 1670.11 | 1670.11 | 1670.11 |
| $CH_4$ | 122.37 | 122.37 | 122.37 | 122.37 | 122.37 |
| $O_2$ | 0.00 | 0.00 | 0.00 | 0.00 | 0.00 |
| $N_2$ | 17.88 | 17.88 | 17.88 | 17.88 | 17.88 |
| Ar | 0.00 | 0.00 | 0.00 | 0.00 | 0.00 |
| $C_2$ | 0.00 | 0.00 | 0.00 | 0.00 | 0.00 |
| $C_3$ | 0.00 | 0.00 | 0.00 | 0.00 | 0.00 |
| $C_4$ | 0.00 | 0.00 | 0.00 | 0.00 | 0.00 |
| $C_5$ | 0.00 | 0.00 | 0.00 | 0.00 | 0.00 |
| $C_6$ | 0.00 | 0.00 | 0.00 | 0.00 | 0.00 |
| $C_7$ | 0.00 | 0.00 | 0.00 | 0.00 | 0.00 |
| TOTAL (lbmol/hr) | 10228.51 | 10228.51 | 10228.52 | 10228.52 | 10228.52 |
| TEMPERATURE (CELSIUS) | 446.22 | 200.00 | 253.20 | 100.00 | 40.00 |
| PRESSURE (BARA) | 77.00 | 76.00 | 76.00 | 76.00 | 76.00 |
| VAPOUR FRACTION | 1.00 | 1.00 | 1.00 | 1.00 | 1.00 |
| LHV (Btu/scf) | 184.17 | 184.17 | 181.91 | 181.91 | 181.91 |
| CARBON (lbmol/hr) |  |  |  |  |  |

FIG. 5D

|  | 12B | 13 | 14 | 15 | 16 |
|---|---|---|---|---|---|
| lbmol/hr |  |  |  |  |  |
| CO | 0.02 | 105.16 | 0.00 | 105.16 | 0.00 |
| $H_2$ | 1.27 | 6259.41 | 5508.28 | 751.13 | 0.00 |
| $CO_2$ | 10.70 | 2041.60 | 0.00 | 41.60 | 2000.00 |
| $H_2O$ | 1658.33 | 11.78 | 0.00 | 11.78 | 0.00 |
| $CH_4$ | 0.03 | 122.33 | 0.00 | 122.33 | 0.00 |
| $O_2$ | 0.00 | 0.00 | 0.00 | 0.00 | 0.00 |
| $N_2$ | 0.00 | 17.88 | 0.00 | 17.88 | 0.00 |
| Ar | 0.00 | 0.00 | 0.00 | 0.00 | 0.00 |
| $C_2$ | 0.00 | 0.00 | 0.00 | 0.00 | 0.00 |
| $C_3$ | 0.00 | 0.00 | 0.00 | 0.00 | 0.00 |
| $C_4$ | 0.00 | 0.00 | 0.00 | 0.00 | 0.00 |
| $C_5$ | 0.00 | 0.00 | 0.00 | 0.00 | 0.00 |
| $C_6$ | 0.00 | 0.00 | 0.00 | 0.00 | 0.00 |
| $C_7$ | 0.00 | 0.00 | 0.00 | 0.00 | 0.00 |
| TOTAL (lbmol/hr) | 1670.35 | 8558.16 | 5508.28 | 1049.88 | 2000.00 |
| TEMPERATURE (CELSIUS) | 40.00 | 40.00 | 40.00 | 40.00 | 15.00 |
| PRESSURE (BARA) | 76.00 | 76.00 | 75.00 | 1.50 | 1.50 |
| VAPOUR FRACTION | 0.00 | 1.00 | 1.00 | 1.00 | 1.00 |
| LHV (Btu/scf) | 0.23 | 217.37 | 274.03 | 115.03 | 115.03 |
| CARBON (lbmol/hr) |  |  |  |  |  |

FIG. 5E

|  | 17 | 18 | 19 | 20 | 21 |
|---|---|---|---|---|---|
| lbmol/hr |  |  |  |  |  |
| CO | 0.00 | 4.12 | 4.12 | 0.00 | 0.00 |
| $H_2$ | 0.00 | 0.49 | 0.49 | 0.00 | 0.00 |
| $CO_2$ | 0.00 | 2264.98 | 2264.98 | 4.28 | 4.28 |
| $H_2O$ | 0.00 | 1007.09 | 1007.09 | 0.00 | 0.00 |
| $CH_4$ | 0.00 | 0.00 | 0.00 | 571.27 | 571.27 |
| $O_2$ | 705.80 | 35.29 | 35.29 | 0.00 | 0.00 |
| $N_2$ | 2631.84 | 2649.72 | 2649.72 | 3.50 | 3.50 |
| Ar | 31.33 | 31.33 | 31.33 | 0.00 | 0.00 |
| $C_2$ | 0.00 | 0.00 | 0.00 | 19.06 | 19.06 |
| $C_3$ | 0.00 | 0.00 | 0.00 | 3.26 | 3.26 |
| $C_4$ | 0.00 | 0.00 | 0.00 | 0.60 | 0.60 |
| $C_5$ | 0.00 | 0.00 | 0.00 | 0.12 | 0.12 |
| $C_6$ | 0.00 | 0.00 | 0.00 | 0.24 | 0.24 |
| $C_7$ | 0.00 | 0.00 | 0.00 | 0.00 | 0.00 |
| TOTAL (lbmol/hr) | 3368.97 | 5993.02 | 5993.02 | 602.33 | 602.33 |
| TEMPERATURE (CELSIUS) | 490.00 | 1491.85 | 77.50 | 15.00 | 138.11 |
| PRESSURE (BARA) | 1.01 | 1.01 | 1.01 | 22.40 | 80.00 |
| VAPOUR FRACTION | 1.00 | 1.00 | 1.00 | 1.00 | 1.00 |
| LHV (Btu/scf) | 0.00 | 0.24 | 0.24 | 931.98 | 931.98 |
| CARBON (lbmol/hr) |  |  | 2269.10 | 627.90 |  |

FIG. 5F

|  | 22 | 23 | 24 | 25 | 26 |
|---|---|---|---|---|---|
| lbmol/hr |  |  |  |  |  |
| CO | 0.00 | 0.00 | 0.00 | 0.00 | 0.00 |
| $H_2$ | 0.00 | 0.00 | 0.00 | 0.00 | 0.00 |
| $CO_2$ | 4.28 | 11.19 | 11.19 | 0.00 | 0.00 |
| $H_2O$ | 0.00 | 0.00 | 0.00 | 8682.25 | 8682.25 |
| $CH_4$ | 571.27 | 1492.67 | 1492.67 | 0.00 | 0.00 |
| $O_2$ | 0.00 | 0.00 | 0.00 | 0.00 | 0.00 |
| $N_2$ | 3.50 | 9.14 | 9.14 | 0.00 | 0.00 |
| Ar | 0.00 | 0.00 | 0.00 | 0.00 | 0.00 |
| $C_2$ | 19.06 | 49.79 | 49.79 | 0.00 | 0.00 |
| $C_3$ | 3.26 | 8.51 | 8.51 | 0.00 | 0.00 |
| $C_4$ | 0.60 | 1.58 | 1.58 | 0.00 | 0.00 |
| $C_5$ | 0.12 | 0.32 | 0.32 | 0.00 | 0.00 |
| $C_6$ | 0.24 | 0.63 | 0.63 | 0.00 | 0.00 |
| $C_7$ | 0.00 | 0.00 | 0.00 | 0.00 | 0.00 |
| TOTAL (lbmol/hr) | 602.33 | 1573.83 | 1573.83 | 8682.25 | 8682.25 |
| TEMPERATURE (CELSIUS) | 500.00 | 15.00 | 138.11 | 15.00 | 16.04 |
| PRESSURE (BARA) | 80.00 | 22.40 | 80.00 | 1.01 | 80.00 |
| VAPOUR FRACTION | 1.00 | 1.00 | 1.00 | 0.00 | 0.00 |
| LHV (Btu/scf) | 931.98 | 931.98 | 931.98 | 0.00 | 0.00 |
| CARBON (lbmol/hr) |  | 1640.63 |  |  |  |

FIG. 5G

|  | 27 | 28 | 29 | 30 | 31 |
|---|---|---|---|---|---|
| lbmol/hr |  |  |  |  |  |
| CO | 0.00 | 0.00 | 0.00 | 0.00 | 0.00 |
| $H_2$ | 0.00 | 0.00 | 0.00 | 0.00 | 0.00 |
| $CO_2$ | 0.00 | 0.00 | 0.00 | 0.00 | 0.00 |
| $H_2O$ | 8682.25 | 8682.25 | 3565.33 | 5116.92 | 3565.33 |
| $CH_4$ | 0.00 | 0.00 | 0.00 | 0.00 | 0.00 |
| $O_2$ | 0.00 | 0.00 | 0.00 | 0.00 | 0.00 |
| $N_2$ | 0.00 | 0.00 | 0.00 | 0.00 | 0.00 |
| Ar | 0.00 | 0.00 | 0.00 | 0.00 | 0.00 |
| $C_2$ | 0.00 | 0.00 | 0.00 | 0.00 | 0.00 |
| $C_3$ | 0.00 | 0.00 | 0.00 | 0.00 | 0.00 |
| $C_4$ | 0.00 | 0.00 | 0.00 | 0.00 | 0.00 |
| $C_5$ | 0.00 | 0.00 | 0.00 | 0.00 | 0.00 |
| $C_6$ | 0.00 | 0.00 | 0.00 | 0.00 | 0.00 |
| $C_7$ | 0.00 | 0.00 | 0.00 | 0.00 | 0.00 |
| TOTAL (lbmol/hr) | 8682.25 | 8682.25 | 3565.33 | 5116.92 | 3565.33 |
| TEMPERATURE (CELSIUS) | 185.00 | 293.27 | 290.00 | 290.00 | 300.00 |
| PRESSURE (BARA) | 80.00 | 80.00 | 80.00 | 80.00 | 80.00 |
| VAPOUR FRACTION | 0.00 | 0.00 | 0.00 | 0.00 | 1.00 |
| LHV (Btu/scf) | 0.00 | 0.00 | 0.00 | 0.00 | 0.00 |
| CARBON (lbmol/hr) |  |  |  |  |  |

FIG. 5H

|  | 32 | 33 | 34 | 35 | 35A |
|---|---|---|---|---|---|
| lbmol/hr |  |  |  |  |  |
| CO | 0.00 | 0.00 | 0.00 | 0.00 | 0.00 |
| $H_2$ | 0.00 | 0.00 | 0.00 | 0.00 | 0.00 |
| $CO_2$ | 0.00 | 0.00 | 0.00 | 0.00 | 0.00 |
| $H_2O$ | 3565.33 | 5116.92 | 9237.63 | 140.24 | 140.24 |
| $CH_4$ | 0.00 | 0.00 | 0.00 | 0.00 | 0.00 |
| $O_2$ | 0.00 | 0.00 | 0.00 | 0.00 | 0.00 |
| $N_2$ | 0.00 | 0.00 | 0.00 | 0.00 | 0.00 |
| Ar | 0.00 | 0.00 | 0.00 | 0.00 | 0.00 |
| $C_2$ | 0.00 | 0.00 | 0.00 | 0.00 | 0.00 |
| $C_3$ | 0.00 | 0.00 | 0.00 | 0.00 | 0.00 |
| $C_4$ | 0.00 | 0.00 | 0.00 | 0.00 | 0.00 |
| $C_5$ | 0.00 | 0.00 | 0.00 | 0.00 | 0.00 |
| $C_6$ | 0.00 | 0.00 | 0.00 | 0.00 | 0.00 |
| $C_7$ | 0.00 | 0.00 | 0.00 | 0.00 | 0.00 |
| TOTAL (lbmol/hr) | 3565.33 | 5116.92 | 9237.63 | 140.24 | 140.24 |
| TEMPERATURE (CELSIUS) | 500.00 | 500.00 | 500.00 | 500.00 | 50.01 |
| PRESSURE (BARA) | 80.00 | 80.00 | 80.00 | 80.00 | 80.00 |
| VAPOUR FRACTION | 1.00 | 1.00 | 1.00 | 1.00 | 0.00 |
| LHV (Btu/scf) | 0.00 | 0.00 | 0.00 | 0.00 | 0.00 |
| CARBON (lbmol/hr) |  |  |  |  |  |

FIG. 5I

|  | 36 | 37 | 38 | 39 | 40 |
|---|---|---|---|---|---|
| lbmol/hr |  |  |  |  |  |
| CO | 0.00 | 0.00 | 10.40 | 0.00 | 10.40 |
| $H_2$ | 0.00 | 0.00 | 126.88 | 719.00 | 845.89 |
| $CO_2$ | 0.00 | 0.00 | 136.36 | 0.00 | 136.36 |
| $H_2O$ | 3760.49 | 5336.90 | 0.00 | 0.00 | 0.00 |
| $CH_4$ | 0.00 | 0.00 | 122.33 | 0.00 | 122.33 |
| $O_2$ | 0.00 | 0.00 | 0.00 | 0.00 | 0.00 |
| $N_2$ | 0.00 | 0.00 | 17.88 | 0.00 | 17.88 |
| Ar | 0.00 | 0.00 | 0.00 | 0.00 | 0.00 |
| $C_2$ | 0.00 | 0.00 | 0.00 | 0.00 | 0.00 |
| $C_3$ | 0.00 | 0.00 | 0.00 | 0.00 | 0.00 |
| $C_4$ | 0.00 | 0.00 | 0.00 | 0.00 | 0.00 |
| $C_5$ | 0.00 | 0.00 | 0.00 | 0.00 | 0.00 |
| $C_6$ | 0.00 | 0.00 | 0.00 | 0.00 | 0.00 |
| $C_7$ | 0.00 | 0.00 | 0.00 | 0.00 | 0.00 |
| TOTAL (lbmol/hr) | 3760.49 | 5336.90 | 413.85 | 719.00 | 1132.86 |
| TEMPERATURE (CELSIUS) | 500.00 | 500.00 | 40.00 | 40.00 | 25.00 |
| PRESSURE (BARA) | 80.00 | 80.00 | 1.20 | 75.00 | 77.00 |
| VAPOUR FRACTION | 1.00 | 1.00 | 0.88 | 0.00 | 0.00 |
| LHV (Btu/scf) | 0.00 | 0.00 | 0.00 | 0.00 | 0.00 |
| CARBON (lbmol/hr) |  |  |  |  |  |

FIG. 5J

|  | 42 | 43A | 44 | 45 | 46 |
|---|---|---|---|---|---|
| lbmol/hr |  |  |  |  |  |
| CO | 0.00 | 0.00 | 0.00 | 0.00 | 0.00 |
| $H_2$ | 0.00 | 0.00 | 0.00 | 0.00 | 0.00 |
| $CO_2$ | 0.00 | 0.00 | 0.00 | 0.00 | 1.07 |
| $H_2O$ | 555.38 | 555.38 | 555.38 | 379.40 | 0.00 |
| $CH_4$ | 0.00 | 0.00 | 0.00 | 0.00 | 147.10 |
| $O_2$ | 0.00 | 0.00 | 0.00 | 0.00 | 0.00 |
| $N_2$ | 0.00 | 0.00 | 0.00 | 0.00 | 0.90 |
| Ar | 0.00 | 0.00 | 0.00 | 0.00 | 0.00 |
| $C_2$ | 0.00 | 0.00 | 0.00 | 0.00 | 4.91 |
| $C_3$ | 0.00 | 0.00 | 0.00 | 0.00 | 0.83 |
| $C_4$ | 0.00 | 0.00 | 0.00 | 0.00 | 0.15 |
| $C_5$ | 0.00 | 0.00 | 0.00 | 0.00 | 0.03 |
| $C_6$ | 0.00 | 0.00 | 0.00 | 0.00 | 0.07 |
| $C_7$ | 0.00 | 0.00 | 0.00 | 0.00 | 0.00 |
| TOTAL (lbmol/hr) | 555.38 | 555.38 | 555.38 | 379.40 | 155.06 |
| TEMPERATURE (CELSIUS) | 25.00 | 29.53 | 500.00 | 500.00 | 15.00 |
| PRESSURE (BARA) | 1.05 | 80.00 | 80.00 | 80.00 | 22.00 |
| VAPOUR FRACTION | 0.00 | 0.00 | 1.00 | 1.00 | 1.00 |
| LHV (Btu/scf) | 0.00 | 0.00 | 0.00 | 0.00 | 931.38 |
| CARBON (lbmol/hr) |  |  |  |  | 161.70 |

FIG. 5K

|  | 47 |
|---|---|
| lbmol/hr | |
| CO | 0.00 |
| $H_2$ | 0.00 |
| $CO_2$ | 1.18 |
| $H_2O$ | 0.00 |
| $CH_4$ | 156.84 |
| $O_2$ | 0.00 |
| $N_2$ | 0.96 |
| Ar | 0.00 |
| $C_2$ | 5.23 |
| $C_3$ | 0.89 |
| $C_4$ | 0.16 |
| $C_5$ | 0.03 |
| $C_6$ | 0.07 |
| $C_7$ | 0.00 |
| TOTAL (lbmol/hr) | 165.36 |
| TEMPERATURE (CELSIUS) | 15.00 |
| PRESSURE (BARA) | 80.00 |
| VAPOUR FRACTION | 1.00 |
| LHV (Btu/scf) | 931.38 |
| CARBON (lbmol/hr) | 172.39 |

PRODUCING AMMONIA USING ULTRAPURE, HIGH PRESSURE HYDROGEN

CLAIM OF PRIORITY

This application claims priority under 35 U.S.C. §119 to U.S. Provisional Application No. 61/348,491, filed May 26, 2010, the entire disclosure of which is incorporated herein by reference.

TECHNICAL FIELD

The present invention relates to producing ammonia and, more particularly, to producing ammonia using high purity, high pressure hydrogen.

BACKGROUND

Hydrogen is used in a variety of applications, from ammonia synthesis to hydrogen vehicle operations. There will be a continuing and, likely, a large-scale increase in future demand for hydrogen from a large single train. To be suitable for delivery to pipelines, the hydrogen must be very pure and at a high pressure. Commonly, hydrogen is produced, purified, and then compressed to provide high pressure hydrogen for various uses. However, the compression of hydrogen is very expensive. The use of hydrogen for ammonia production is a well-established process. The commonly used methods of $H_2$ production to produce the $H_2$ to $N_2$ mixture of 3 to 1 ratio generally result in the presence of additional inert impurities such as methane and argon being present in the gas mixture.

Ammonia is synthesized in a closed cycle catalytic reactor system with heat recovery and cooling of the circulating gas mixture to condense the ammonia which is removed from the loop as a liquid product. Any inert impurities which enter the loop with the fresh feed gas and which are in excess of the small quantity removed by dissolution in the liquid ammonia product must be removed by purging gas from the loop. Generally the impurity level is allowed to build up to about 15% molar in the circulating gas mixture leaving the ammonia condenser. This results in a serious loss of $H_2+N_2$ which must be separated from the inert components and optionally recompressed and returned to the ammonia synthesis loop. The pressure in the ammonia synthesis loop is in the range 100 bar to about 300 bar. The fresh $H_2+N_2$ feed must be compressed from the $H_2$ generation pressure up to these high pressures.

SUMMARY

In various implementations, ammonia is produced using ultrapure, high pressure hydrogen. Some systems may generated the $H_2$ at high purity and high pressure and mixed it with pure $N_2$ separated from the air and at high pressure. The hydrogen and nitrogen may be in the stoichiometric 3 to 1 ratio giving without or otherwise independent of including a loop purge gas stream and minimizing or otherwise reducing the feed gas compression power.

The hydrogen may be very pure (e.g., less than approximately 20 ppm in total impurity level by volume) and at high pressure (e.g., approximately 60 bar to 200 bar) for various uses, such as pipeline delivery. In some implementations, ammonia may be produced by combining ultrapure, high pressure hydrogen at a 3 to 1 ratio with nitrogen. In some implementations the ultrapure high pressure $H_2$ may be produced from an $H_2+CO$ synthesis gas generated by a process which in part uses a substantially pure oxygen stream as the oxidant in either a partial oxidation reactor (POX) or an autothermal catalytic reactor (ATR). The production of pure oxygen at high pressure may be carried out in a cryogenic oxygen plant optionally using a pumped oxygen cycle. This plant can easily be designed to produce an additional high purity, less than 20 parts per million (ppm) total impurity, high pressure nitrogen stream. This gas mixture may be compressed and introduced to a reactor through which recycle and fresh make-up gas may be circulated at a temperature above 500° C. and pressures upwards of 100 bar. If the gas mixture can be produced with a total concentration of impurities such as argon and methane below about 50 ppm then there may be substantially no build-up of inert impurities in the ammonia synthesis reactor loop which lead to purging and loss of $3H_2+N_2$ gas. In some instances, ammonia may be produced by combining $H_2$ at a very high pressure such as 80 to 100 bar and at high purity with a source of nitrogen available at the substantially the same pressure and with a similar high purity.

In plants producing an ultrapure hydrogen product stream, the carbon monoxide content of the gas mixture produced by a combination of partial oxidation and steam reforming of a hydrocarbon feedstock would be converted to hydrogen by a catalytic shift reaction with steam which produces $CO_2$ as a by-product. The impurities in the $H_2$ are removed by a succession of purification steps including but not limited to pressure swing adsorption in a multi-bed cyclic system, and absorbtion of $CO_2$ in a physical or chemical absorbent with regeneration of the solvent. The system may achieve a hydrogen recovery of over 95% of the total $H_2$ potential production in the synthesis gas derived from both $H_2$ and CO content as high pressure pure hydrogen product. In some implementations, a thermal efficiency (LHV basis based on hydrogen product/total natural gas feed) of greater than approximately 75% may be achieved using various implementations of the systems and processes.

In some implementations, the systems and processes for the production of ultrapure hydrogen may produce an ultrapure $3H_2+N_2$ gas mixture stream (e.g., rather than an ultrapure hydrogen stream) for delivery to an ammonia synthesis system, which may not require substantially all inert gases purging from the ammonia reaction loop. The $CO_2$ stream separated from the $H_2$ and produced in the systems and processes may be utilized by combination with ammonia product in urea production. In some implementations for the production of ultra-pure $H_2$, the byproduct $CO_2$ may be delivered for sequestration to, for example, avoid atmospheric pollution.

One feature may include a very high efficiency hydrogen production facility. Another feature may include using natural gas as the feedstock.

The details of one or more implementations are set forth in the accompanying drawings and the description below. Other features, objects, and advantages of the implementations will be apparent from the description and drawings.

DESCRIPTION OF DRAWINGS

FIGS. 5 A-K illustrate feed stream compositions for an example of a feed stream being processed by the system illustrated in FIG. 4.

Like reference symbols in the various drawings indicate like elements.

DETAILED DESCRIPTION

In various implementations, feed streams are processed to produce high purity (e.g., less than 20 ppm by total volume of other components) and high pressure (e.g., greater than approximately 60 bars) $3H_2+N_2$ synthesis gas streams for ammonia production. The processed feed streams may include high purity, high pressure hydrogen and high purity, high pressure nitrogen at ratios that produce ammonia.

Figure 1:
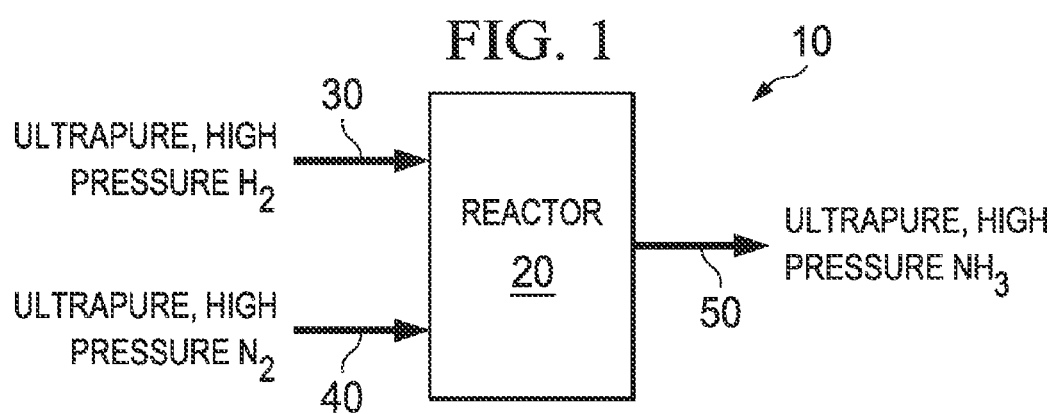
FIG. 1 illustrates an example system for the production of ammonia.

FIG. 1 is a block diagram that illustrates an example ammonia system 10 for producing ultrapure, high pressure ammonia in accordance with some implementations of the present disclosure. For example, the system 10 may produce $3H_2+N_2$ synthesis gas for ammonia production with less than 20 parts per million (ppm) by total volume of other components and with pressure greater than approximately 60 bars. The illustrated implementation includes a reactor 20 that receives an ultrapure, high pressure hydrogen stream 30 and an ultrapure, high pressure nitrogen stream 40 and generates an ultrapure, high pressure ammonia stream 50. In some implementations, the ultrapure, high pressure hydrogen stream 30 may be produced using the method described with respect to FIGS. 2-5. In these instances, shift reactors are used to produce ultrapure, high pressure hydrogen using a feed stream that may include methane, such as natural gas, hydrocarbon fuels, methane rich gases such as coalbed methane and/or biogas (e.g., stream produced from the anaerobic decay of matter). The feed streams may include liquid hydrocarbon streams.

In some implementations, the reactor 20 may receive the ultrapure, high pressure hydrogen stream 30 at about a 3 to 1 ratio with the nitrogen stream 40. The total feed gas stream may be compressed to the reactor 20 operating pressure, which may be in the range of about 100 bar to 400 bar. The gas mixture may be added to the recycle flow in the reactor loop, which may be circulated at a temperature above 500° C. and pressures upwards of 100 bars. If the gas mixture of the hydrogen stream 30 and the nitrogen stream 40 can be produced with a total concentration of impurities, such as argon and methane, below about 50 ppm then the reactor 20 may minimize, eliminate or substantially reduce build-up of inert impurities in the ammonia synthesis reactor loop, which may lead to the elimination of or otherwise reduce purging and loss of $3H_2+N_2$ gas. In other words, the system 10 may operate without or otherwise independent of a loop purge. This may increase the efficiency of ammonia production by lowering total loop operating pressure without lowering the $3H+N_2$ partial pressure. In some instances, the stream 30 and 40 may have substantially the same high pressure of about 80 to 100 bar, with substantially the same high purity with a source of nitrogen available at the substantially the same pressure and with substantially the same high purity, such as less than 20 ppm. In some implementations, the $N_2$ stream 40 may be generated at an $O_2$ plant. For example, a cryogenic oxygen plant may produce the nitrogen stream 40 with less than about 20 ppm by volume impurity level (e.g., level of impurities such as oxygen and argon). The level of $O_2$ in the $N_2$ may be reduced to a level substantially lower than 20 ppm, such as below 2 ppm, as $O_2$ reacts with and destroys the action of the iron based ammonia catalyst. The nitrogen stream 40 may be compressed and mixed with hydrogen from the described systems and processes in the ratio of approximately $3H_2/N_2$. The by-product $CO_2$ may be used for urea production. As part of the $H_2$ purification process the CO content may be reduced to below 2 ppm first by reaction with steam over a catalyst to produce $H_2$ and $CO_2$ followed by $CO_2$ removal optionally by scrubbing the gas with a physical solvent such as selexol or a chemical solvent such as an amine solution. In addition, a multi-bed pressure swing adsorption system may remove substantially all residual inert impurities including methane and argon. The pure $CO_2$ produced in the solvent scrubbing system may be used for the production of urea by reaction with ammonia. The system 100 may provide one or more of the following: low capital cost and/or compact syngas generation section; heat consumption below about 27.0 million btu/metric ton $NH_3$ (LHV); $O_2$ requirement of at least about 470 metric tons per day for 1000 metric tons/day of ammonia; and/or others.

FIGS. 2-5 illustrate example methods for producing a hydrogen stream 30 in accordance with some implementations. Though, the ultrapure, high pressure stream 30 may be produced using some, none, or all of the following without departing from the scope of the disclosure. In other words, the reactor 20 is not limited to hydrogen streams 30 produced by the methods described below.

Figure 2:
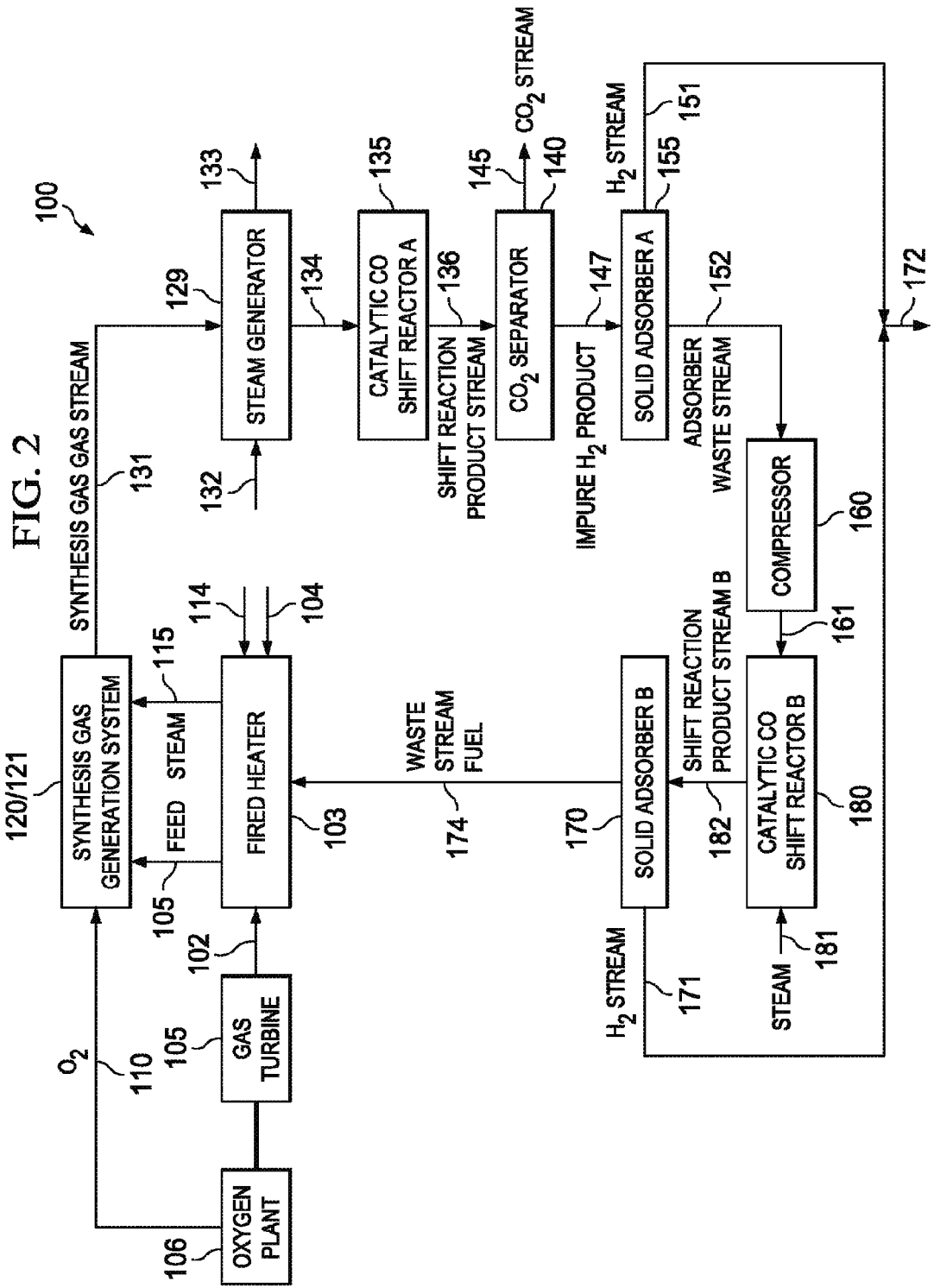
FIG. 2 illustrates an example system for the production of hydrogen.

FIG. 2 illustrates an example of a system for the production of ultrapure, high pressure hydrogen streams. A pre-heated feed stream 105 may be introduced into synthesis gas generation systems 120 and 130. For example, a feed stream, such as natural gas, may be introduced to a POX/GHR synthesis gas generation system that includes a Partial Oxidation Reactor (POX) combined with a Gas Heated Catalytic Reformer (GHR), in which the combined POX product gas and the product gas from the GHR are used to provide the total or at least a substantial portion of the heat requirement of the GHR. As another example, the feed stream may be fed into an ATR/GHR combined synthesis gas generation system that includes an Autothermal Reformer (ATR) combined with a GHR, in which the combined ATR product gas and gas from the GHR are used to provide the total or at least a substantial portion of the heat requirement of the GHR.

The feed stream 105 and/or a superheated steam stream 115 are both split into two parts. The first portions are fed to the POX or ATR 120 to be reacted with oxygen 110 and steam to produce a synthesis gas stream and the second portions are fed to the GHR 121 where they are reformed over a catalyst with heat provided by the stream from the POX or the ATR 120 combined with the product synthesis gas stream from the GHR 121 to produce a total synthesis gas product stream 131. For example, the feed stream 105 may undergo partial oxidation (eqn 1) in a POX reactor, for example. In addition, some total oxidation (eqn 2) may occur, and there may be a shift reaction (eqn 4). In addition the ATR reaction includes the steam methane reforming reaction (eqn 3). The reactions may include:

$$CH_4 + \tfrac{1}{2}O_2 \rightarrow CO + 2H_2 \qquad (1)$$

$$CH_4 + 2O_2 \rightarrow CO_2 + 2H_2O \qquad (2)$$

The product synthesis gas from the POX or ATR reactions produces a very high temperature gas mixture that may be used to provide part of the endothermic heat of reaction for steam/hydrocarbon reforming in a secondary downstream gas-heated catalytic reformer (GHR). The remaining part of the heat requirement is provided by mixing the product gas from the GHR with the product gas from the POX prior to the total gas stream being used to heat the GHR. The steam reforming reactions may include:

$$CH_4 + H_2O \rightarrow CO + 3H_2 \quad (3)$$

$$CO + H_2O \rightarrow CO_2 + H_2 \quad (4)$$

In the case of the ATR/GHR, the ATR reactor contains a layer of catalyst downstream of the partial oxidation burner in which the steam reforming reaction (eqn 3) and the shift reaction (eqn 4) can approach equilibrium.

The synthesis gas stream 131 may include hydrogen and carbon monoxide. The synthesis gas stream 131 may also include unreacted feed components, methane, water, carbon dioxide, argon, and/or nitrogen. The relative concentrations of carbon monoxide and hydrogen may depend, for example, on the hydrocarbon feed composition (e.g., methane is only used in these equations for simplicity, but other components may be present in the feed and be oxidized and/or reformed), pressure, and/or outlet temperature from the catalyst beds. The oxygen purity can be in the range 90 to near 100% by volume $O_2$ and, more particularly, can be in the range 95% to 99.5% $O_2$ by volume.

The objective of this process is to produce very high pressure $H_2$ directly from the synthesis gas generation system at high purity. Reactions 1 to 3 are adversely affected by higher pressures, while reaction 4 is independent of pressure. Reactions 1 and 2 may compensate for higher pressure by a relatively small increase in reaction temperature, which may be achieved through a slight increase in the oxygen to hydrocarbon ratio. The increase in the oxygen to hydrocarbon ratio and the small increase in temperature will not cause significant problems in the design of the equipment.

Due to temperature constraints in catalyst operating conditions in a system using an ATR, the outlet temperature must not be exceeded. The metallurgical properties of the metal alloy used for the GHR tubes mean that the outlet temperature of the GHR tubes in particular must not be increased above certain limits. This means that we have to accept an increase in the concentration of $CH_4$ left unconverted by reaction 3 in the total synthesis gas product stream 131 leaving the GHR.

In order for the GHR system to operate as a steam/hydrocarbon reforming reactor at high pressures above 60 bar, it is necessary to use a very high steam to active carbon ratio in the feed to the GHR in order to control the methane concentration in the synthesis gas product 131. This should be above 5, and preferably in the range 5 to 10. The actual steam to active carbon ratio in the hydrocarbon feed to the GHR depends on the pressure and the GHR catalyst tube outlet temperature. The ratio is chosen to limit the ratio of $CH_4$ to $(H_2+CO)$ in the synthesis gas product leaving the GHR tubes to a minimum of 5% and preferably in the range 5% to 10% (molar). In order to compensate for the extra heat load on the GHR caused by the difference in temperature between the feed to the GHR tubes and the temperature of the product stream 131 leaving the shell side, the POX outlet temperature should be higher than a normal figure of about 1340° C. The POX outlet temperature may be raised by increasing the oxygen to hydrocarbon ratio in the POX feed so that the POX outlet temperature is above 1400° C. and preferably in the range 1425° C. to 1500° C. When using an ATR, the maximum outlet temperature will be in general below 1050° C. and in this case the ratio of synthesis gas from the ATR to that from the GHR will be increased.

In order for the GHR system to operate as a steam/hydrocarbon reforming reactor at high pressures (e.g., above 60 bar), a very high steam to active carbon ratio in the feed may be used. Thus, for the production of synthesis gas, a higher methane content in the outlet gas from the GHR and ATR will be produced. However, the outlet gas stream from the POX may not have a higher methane content. Since about 70% of the syngas may be produced from the POX reactor and about 30% from the GHR, it is possible to tolerate a much larger $CH_4$ content in the GHR outlet gas than from, for example, a stand-alone steam/natural gas reformer. Although it is not possible to increase the outlet temperature from the ATR, the outlet temperature of greater than 1000° C. means that the $CH_4$ content will be less than 1%, so an increase caused by the desire to increase the reaction pressure will not have a significant effect. A further characteristic of the GHR design used in this process is the fact that the GHR catalyst filled tubes are mounted in a vertical bundle with an inlet tube sheet at the top colder end, and with the bottom hot outlet ends open, so that the tubes are free to expand downwards when heated to operating outlet temperatures, which will be in the range 800° C. to 900° C. This means that the pressure difference between the inside and outside of the GHR tubes, when operating at design conditions, is quite small. The sum of the pressure drop in the catalyst filled tube plus the shell side pressure drop is a maximum value at the cold upper end of the GHR tubes and approximately zero at the bottom hot end of the tubes. The GHR can operate at any pressure up to an economic limitation caused by the pressure vessel design and any pressure constraint in the gas purification system chosen caused by the progressively higher gas pressure. This is quite different from a steam/natural gas reformer, where the furnace operates at near atmospheric pressure, and the strength of the tubes imposes a pressure limitation on the synthesis gas pressure which is generally below 35 to 40 atm. The multi-bed pressure swing adsorption process is favored for $H_2$ purification, as it is capable of producing high $H_2$ purity at reasonably high recovery and capital cost. The $H_2$ recovery is dependent on the feed gas composition, the operating pressure, the temperature, the characteristics of the adsorbents used in the beds, and the complexity of the multi-bed switching sequence used. For a steam/natural gas reformer synthesis gas stream at, for example, 25 atm pressure, the recovery of $H_2$ in the PSA could be as high as 90% of the $H_2$ in the feed gas. In some implementations, a feature of the system may include operating the system at as high a recovery and pressure as possible. Increasing the pressure will reduce the $H_2$ recovery from the PSA but this reduction is quite small at pressure of up to 100 bar. However, the $H_2$ produced may be a higher pressure, which may be more cost-efficient than compressing the $H_2$ produced at a lower pressure to the higher pressure. In order to achieve a good $H_2$ recovery, it is proposed to use a two-stage PSA process preceded by a $CO_2$ removal step, which has the advantage of making $CO_2$ available as a separate product and removing the largest individual contaminant from the PSA feed stream, thus making the job of $H_2$ purification at high pressure and high recovery easier to achieve. It has been determined that it will be possible to operate a two-stage PSA system, with treatment of the waste gas from the first PSA before it becomes the feed stream to the second PSA, to achieve a recovery of greater than 95% of the $H_2+CO$ present in the PSA feed gas stream. The waste gas from the first PSA is compressed from about 1.2 atm up to a pressure above the first PSA feed pressure to allow for pressure losses and then it is preheated to a temperature in excess of 170° C. Sufficient steam is added and the gas mixture is passed through a catalytic shift reactor to convert CO and steam to $CO_2$ and $H_2$ according to reaction 4. The gas mixture is then cooled with heat recovery to near ambient temperature and the gas becomes the feed to the second PSA.

The waste gas from the second PSA contains the significant quantity of $CH_4$ caused by the operation to produce an $H_2$ product stream at high pressures above 60 atm. In addition, it contains nitrogen and/or argon from the $O_2$ stream 110 and/or the feed stream 105. Recycling this gas back to the feed stream 105 would result in a build-up of $N_2$+Ar in the system. However, by operating the POX/GHR or ATR/GHR in accordance with the teachings of U.S. Pat. Nos. 6,669,744 and 6,534,551, a significant build-up of these gases in the system may not occur. These patents describe a synthesis gas generation process using a POX/GHR or an ATR/GHR in the series arrangement described in this disclosure. There is a gas turbine which is used to provide the power to directly drive the cryogenic oxygen plant. The gas turbine exhaust, which still has a significant concentration of oxygen, is used to support the combustion of hydrocarbon and flammable waste gases from the synthesis gas generation and purification system in a fired heater, which provides the additional heat for steam superheat and syngas feed pre-heating. The waste gas from the second PSA is used to provide part of the fuel gas for the fired heater. Alternatively at least part of the waste gas could be used, after compression, to provide at least part of the fuel gas for the gas turbine. Therefore, methane may be separated from the hydrogen and/or a means of efficiently and economically using the separated methane in the synthesis gas generation process may be provided. The combustion of the waste gas and the rejection of the combustion products to atmosphere provides a vent for inerts such as nitrogen and Argon. In some implementations, the GHR may be well suited to high pressure operation from a mechanical design perspective, since the vertical open-ended catalyst-filled tubes may have minimal pressure drop differential across them with the mixed product high pressure gas stream on the shell side.

The total synthesis product gas stream 131 is at a temperature in the range 600° C. to 800° C. It is passed through a heat recovery steam boiler 129, which receives a boiler feedwater stream 132 and produces a steam stream 133. The cooled synthesis gas stream 134 is passed through a catalytic shift reactor system 135 which converts a large portion of the CO content of the gas stream to $H_2$ in accordance with reaction 4. The shift system will in general include heat recovery of the exothermic heat of reaction and can be a single-stage, a two-stage, or an isothermal reactor design.

The shift reaction product stream 136 may include hydrogen and carbon dioxide. The shift reaction product stream 136 may also include carbon monoxide, methane, nitrogen, argon, and water vapor.

The cooled shift reaction product stream 136 may be processed by a $CO_2$ separator 140 producing a separated $CO_2$ product stream 145. The $CO_2$ separator may include chemical or physical absorbtion processes using solvents, such as MDEA (methyldiethanol amine) or Selexol, commercially available from UOP LLC (Des Plaines, Ill.). The $CO_2$ separator may be a pressure swing adsorption process (PSA).

The carbon dioxide stream 145 may have a low level of components (e.g., less than 1%) other than carbon dioxide. The carbon dioxide may be provided to other components of the system and/or provided for use in other processes (e.g., urea production) or it may be compressed and sequestered to avoid atmospheric contamination.

The impure $H_2$ product stream 147 may include hydrogen, carbon monoxide, methane, carbon dioxide, nitrogen, argon, and water vapor. Stream 147 may be introduced to a solid adsorption gas purification system 155. The solid adsorber may be a multi-bed pressure swing adsorber (PSA) and may include layers of solid adsorbing materials (e.g., alumina, silica gel, active carbon, xeolites, etc.). The solid adsorber 155 may be a high pressure PSA, for example. The selected solid adsorber may be based on the level of purity desired for a stream and/or the desired composition of a stream. At least a portion of the separator feed stream 147 may be adsorbed by the solid adsorber 155. For example, at least a portion of CO, $CO_2$, $CH_4$, $N_2$, Ar, and $H_2O$ may be adsorbed. The solid adsorber 155 may produce a hydrogen stream 151. The hydrogen stream 151 may include less than approximately 20 ppm of other components and/or have a pressure of at least approximately 60 bars. In some implementations, the hydrogen stream may have a pressure of approximately 60 bars to 200 bars.

The solid adsorber 155 may be regenerated to provide an adsorber waste stream 152. The adsorber waste stream 152 may include carbon oxides, such as carbon monoxide and carbon dioxide. The adsorber waste stream 152 may be compressed to a pressure in excess of stream 147 to allow for pressure losses in compressor 160. The compressed waste gas stream 161 and steam stream 181 may be reacted in a CO shift reactor system 180 which includes preheating and heat recovery to produce a cooled $H_2$ rich gas stream 182.

The shift reaction product stream 182 may include $H_2$, CO, $CO_2$, $CH_4$, $N_2$ and Ar. The shift reactor product stream 182 may be processed by a solid adsorber 170. The solid adsorber 170 may be similar to the solid adsorber 155, in some implementations. The solid adsorber 170 may be a multi-bed pressure swing adsorber and may include layers of solid adsorbing materials (e.g., alumina, silica gel, active carbon, xeolites, etc.). The selected solid adsorber may be based on the level of purity desired for a stream and/or the desired composition of a stream.

At least a portion of the shift reaction product stream 182 may be adsorbed by the solid adsorber 170. For example, at least a portion of CO, CO2, CH4, $N_2$, Ar, and $H_2O$ may be adsorbed. The solid adsorber 170 may produce a hydrogen stream 171. The hydrogen stream 171 may include less than approximately 20 ppm of other components and/or have a pressure of at least approximately 60 bars. In some implementations, the hydrogen stream may have a pressure of approximately 60 bars to 200 bars.

The solid adsorber 170 may be regenerated to provide a waste gas stream 174, which contains $N_2$ and Ar, which, in some implementations, may not be recycled back to the synthesis gas generation system to inhibit build-up of these gases in the system. Stream 174 is a valuable fuel gas stream which may be provided for operation of various components of the system 100. For example, a fired heater 103 may be utilized to heat processed water to produce steam for the process and/or to preheat the feed stream 104 to produce heated feed stream 105 and/or to superheat steam stream 114 to produce superheated steam stream 115. The stream 174 may be combusted in the fired heater 103 to provide part or all of the heat generated in the fired heater.

The system 100 described in FIG. 1 illustrates an implementation which includes the synthesis gas generation system and process described in U.S. Pat. Nos. 6,534,551 and 6,669,744 to produce synthesis gas. Combustion air 102 for the fired heater 103 utilises high temperature exhaust gas from a gas turbine 105 which is used to produce power for the operation of an oxygen production plant 106 which produces the oxygen feed steam 110 As another example, a feed stream may be reacted with air and/or steam. In some implementations, produced hydrogen streams may be provided to a compressor for further pressurization. For example, if a hydrogen stream of approximately 400 bars was specified for a particular application, the hydrogen stream from the system may be further compressed to 400 bars. Although an additional compression may be utilized, the costs of utilizing the compressor in conjunction with systems, such as system 100, may be more cost-effective and/or efficient when compared to compressing hydrogen from common hydrogen production systems which produce $H_2$ at lower pressures (e.g., 30 bars from a steam/natural gas reformer.).

In some implementations, the hydrogen stream 151 and the hydrogen stream 171 may be combined. The combined hydrogen stream 172 may have a level of impurities less than approximately 20 ppm. The combined hydrogen stream may have a pressure of greater than approximately 60 bars. In some implementations, the combined hydrogen stream may have a pressure of approximately 60 bars to 200 bars.

In some implementations, at least a portion of the separated waste gas streams, which may include inert gases and carbon oxides, may be used as part of a fuel gas stream in a fired heater using as combustion air the gas turbine exhaust and/or an air stream. The heat generated may be used to preheat the hydrocarbon and steam feeds to the synthesis gas generation units. Since a significant quantity of argon and nitrogen, which may be from the oxygen stream and/or feed streams, may be included in the waste gas streams, a simple recycle of the $CH_4/Ar/N_2$ in streams back to the feed point of the synthesis gas generation system may cause a build-up of these components in the system. Thus, use of separated waste gas streams as fuel may reduce process waste streams and/or improve cost-efficiency of processes (e.g., due to the recycle as fuel).

Although the feed stream is described as including methane, the feed stream may include other components such as other hydrocarbons (e.g., ethane, propane, butane, pentane, benzene), other carbon and hydrogen containing compounds (e.g., carbon dioxide, carbon monoxide, hydrogen, alcohols, etc.), organic compounds, nitrogen, argon, etc. The feed stream may be natural gas, gases associated with the production of gasoline, combustible off-gasses from other processes, liquid hydrocarbons, etc. In some implementations, when the feed stream may be processed natural gas, for example, the sulfur compounds in natural gas may be removed or at least partially removed to prevent catalyst damage.

Although the synthesis gas is described as including carbon monoxide and hydrogen, the synthesis gas may also include other components, such as inert gases (e.g., nitrogen or argon). In some implementations, carbon oxides may include oxides of carbon, such as carbon monoxide and carbon dioxide. Although streams have been described to include various components in the implementations, the streams may include one or more other components.

Various other implementations may be utilized in combination with systems, such as system 100 illustrated in FIG. 1. In addition, various steps may be added, modified, and/or omitted. As an example, the carbon dioxide separated from the product synthesis gas stream may be provided to other processes (e.g., urea production processes or as a compressed stream for sequestration.). Alternatively, a portion of the separated $CO_2$ may be recycled back to the synthesis gas generation section and added to the feed gas to the POX, ATR, or GHR. In this case, the effect would be to allow part of the total synthesis gas product to bypass the shift reaction stage and be produced as a hydrogen plus carbon monoxide product stream for methanol or Fischer-Tropsch hydrocarbon liquids production. The remaining portion of the synthesis gas product would be processed as defined in system 100 to produce an approximately pure $H_2$ product. In this example, the duty of the $CO_2$ removal stage would be divided between the two product streams with, in the case of liquid scrub systems, a common regeneration system. As another example, the hydrogen stream produced by both PSA adsorbers may be combined. The combined hydrogen stream may have a pressure above approximately 60 bars and/or an impurity level of less than approximately 20 ppm. In some implementations, one or more of the streams of hydrogen prior to the combination of the streams may not have a pressure of approximately 60 bars and/or impurity levels of less than approximately 20 ppm, although the combined stream may satisfy these criteria. High-pressure hydrogen may be useful in the hydrotreatment processes in refineries (e.g., hydrogen in the range of approximately 100-140 bars is often used), hydrogen transportation (e.g., hydrogen is often transported at from approximately 80-120 bars), and/or ammonia production (e.g., hydrogen is often used at 100-300 bars).

In some implementations, the described systems and processes or portions thereof may be operated at pressures greater than 60 bars. For example, the streams produced by various parts of the systems and processes may have pressures greater than 60 bars. As another example, the system, such as system 100 illustrated in FIG. 1, may be operated at a pressure greater than 60 bars. As another example, streams, such as streams 125, 131, 134, 136, 147, 151, 171, 172, 161, 182, 181, 110, 105, and 115 illustrated in FIG. 1, may be greater than 60 bars. In some implementations, the steam, oxygen, and/or air utilized in the system may be provided to components of the system, such as components 120, 130, 140, 155, 170, 180, and/or 103 illustrated in FIG. 1.

In some implementations, the hydrogen recovery may be greater than approximately 95%. The hydrogen recovery may be defined as:

Hydrogen Recovery=100%×(moles of hydrogen product produced)/(total moles of hydrogen and carbon monoxide in the synthesis gas)

For example, the hydrogen recovery for the system illustrated in FIG. 1 may be:

Hydrogen Recovery=100%(moles of hydrogen in stream 151+moles of hydrogen in stream 171)/(moles of hydrogen in stream 131+moles of carbon monoxide in stream 131).

In some implementations, hydrogen purity of approximately 99.998% by volume may be achieved. Carbon captured as carbon dioxide from the hydrocarbon feed may be approximately 80% to 85% of the carbon present in the total feed to the plant, including gas turbine fuel and additional feed to the fired heater.

In some implementations, the hydrogen produced may be utilized in conjunction with ammonia synthesis. If an ammonia synthesis gas is required, a cryogenic oxygen plant may produce a nitrogen stream with less than 20 ppm by volume impurity level (e.g., level of impurities such as oxygen and argon). The nitrogen stream may be compressed and mixed with hydrogen from the described systems and processes in the ratio of approximately $3H_2/N_2$. The nitrogen product stream may contain less than 2 ppm O2 molar. The total level of O2_CO═H2O in the total 3H+N2 gas stream entering the ammonia loop may be less than 5 ppm and preferably less than 2 ppm as all these oxygen containing molecules react with the iron based ammonia synthesis catalyst.

In some implementations, a thermal efficiency (LHV basis), based on hydrogen product/total natural gas feed) of greater than approximately 75%, may be achieved using the described systems and processes.

Figure 3C:
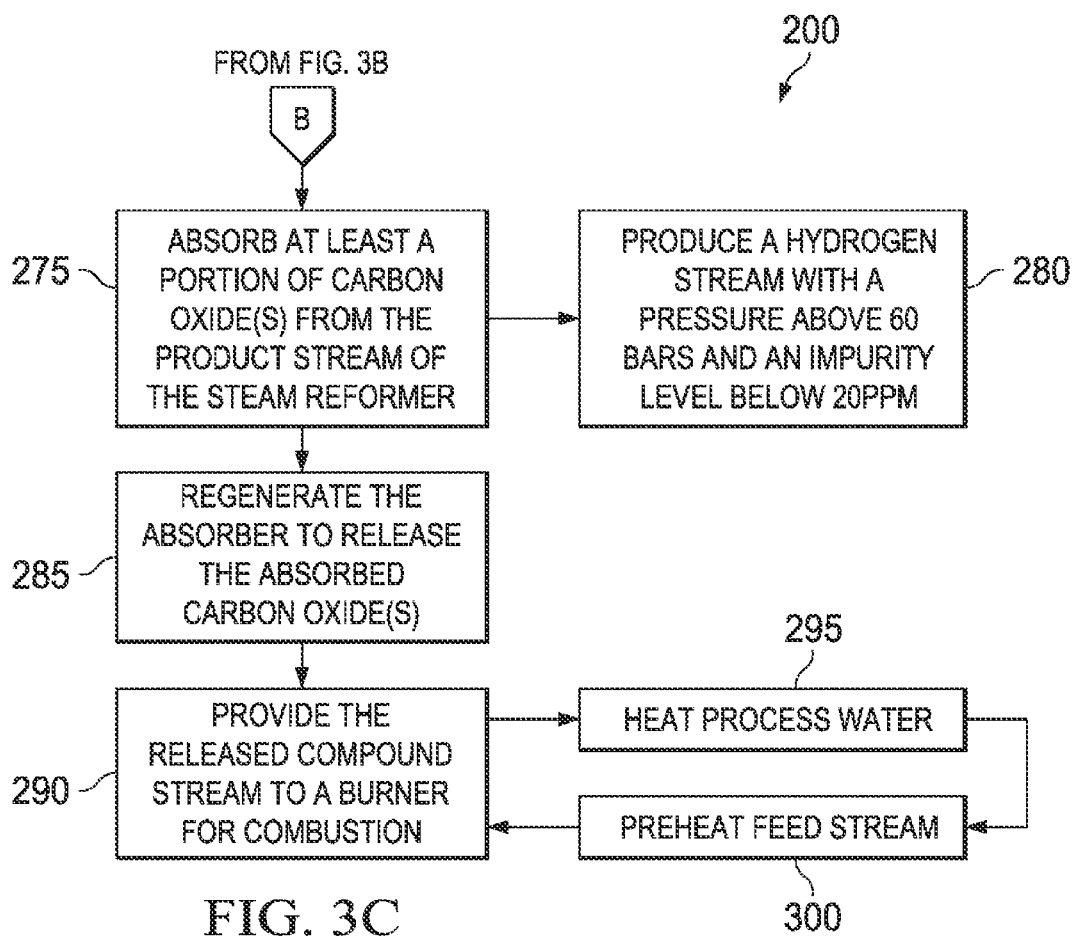
FIG. 3 illustrates an example system for the production of hydrogen.

FIG. 3 illustrates an example system for the production of ultrapure and high pressure hydrogen streams. The corresponding composition flows and process conditions for the points identified in FIG. 3 are given in FIG. 4. For example, system 201 may include a POX/GHR system and produce a combined hydrogen stream at 75 bars. As illustrated, a compressed oxygen stream 2 may be generated in a pumped liquid oxygen cryogenic Air Separation Unit (ASU). The oxygen stream 2 may be preheated (e.g., by heat from steam heated by fuel 38 combusted in a fired heater burner), and provided to a POX with a natural gas feed stream 5. The natural gas feed stream 5 may be preheated (e.g., by heat generated by a fuel 38 and/or natural gas 47, such as natural gas from the feed stream, combusted in a fired heater burner).

In the POX, the natural gas stream 5 may be partially oxidized to produce synthesis gas stream 4 (e.g., a stream that includes hydrogen and carbon monoxide). The synthesis gas stream 4 may include unreacted feed from the natural gas stream 5 and/or byproducts such as carbon dioxide, methane, nitrogen, oxygen, and water vapor. The synthesis gas stream 4 may enter the shell side of the GHR.

In some implementations, a stream 6 including a mixture of natural gas and/or steam (e.g., at approximately 550° C.) may also be fed into the GHR. The stream 6 may be preheated (e.g., by heat generated by fuel 38 combusted in a fired heater burner). The mixture of natural gas and steam may flow downwards through the catalyst in the GHR (e.g., catalyst filled vertical open ended tubes) and may exit the GHR as a mixture of hydrogen and carbon dioxide plus some carbon monoxide, nitrogen, argon and water vapor. This gas may exit at approximately 900° C. This gas stream may also mix with the product gas stream 4 from the POX. The combined stream (e.g., gas exiting the catalyst tubes mixed with the product stream from the POX) may flow upwards through the shell side of the GHR and/or may provide the heat required for the steam/hydrocarbon reforming reactions. The product gas stream 7 may exit the GHR at approximately 600° C. The product gas stream 7 may include synthesis gas and may be cooled to produce a cooled stream 8. The product gas stream 7 may be cooled in a waste heat boiler producing steam stream 31 from a preheated boiler feedwater stream 29. The steam stream 31 exiting the waste heat boiler may include saturated steam and may be superheated as it passes though the fired heater.

The cooled product stream 8 at a temperature of 320° C. may be passed through a two-stage catalytic shift reactor. In the high temperature shift reactor, at least a portion of the CO in stream 8 may be reacted with steam to produce carbon dioxide and hydrogen according to reaction 4.

The product stream 9 from the high temperature shift reactor may be cooled by boiler feed water stream 27, which is heated to 293° C. The cooled product stream 10 at 200° C. may be provided to a low temperature shift reactor. In the low temperature shift reactor, the cooled product stream 10 will undergo similar shift reaction to that defined for the high temperature shift reactor, resulting in the final CO concentration in the product gas (dry basis) of 1.25% by volume.

The product stream 11 from the low temperature shift reactor may be cooled by boiler feed water stream 25, which is heated to 185° C. Final cooling of the product gas from 100° C. to 40° C. using, for example, cooling water, is followed by separation of condensed water in a separator vessel. The bottom stream 12B from the separator may include water. The bottom stream 12B may also include other dissolved components, such as hydrogen, carbon dioxide, and/or carbon monoxide, methane, nitrogen, and argon in quantities significantly lower than the gas product stream. For example, a small portion (e.g., less than 5%) of the gaseous products may be dissolved in the bottom stream).

The gas product stream 13 may be provided to a carbon dioxide separator. The carbon dioxide separator may separate the carbon dioxide from the gas product stream to produce a carbon dioxide stream 16. The carbon dioxide stream 16 may be at least 90% carbon dioxide and may be greater than 99% carbon dioxide.

The product stream from the carbon dioxide separator may flow to a solid adsorber, $H_2$ PSA 1. The waste stream 15 may include hydrogen, carbon dioxide, carbon monoxide, methane, nitrogen, argon and water vapor. Substantially all of these components are separated from the hydrogen product stream 14.

The $H_2$ PSA 1 is a multi-bed system with each bed containing layers of adsorbent designed to separate the contaminants from the hydrogen and maximize $H_2$ recovery. Adsorbents used include alumina, silica gel, active carbon, and/or zeolites.

The hydrogen stream 14 may be ultrapure hydrogen (e.g., less than 20 ppm of other components in the stream by volume) and/or at high pressure (e.g., pressure greater than 60 bar).

The adsorber may be regenerated to release at least a portion of the absorbed components. The released component stream 15 may be compressed and flow to a catalytic CO shift reactor system. A steam stream 45 may be provided to the CO shift reactor. The CO shift reactor may also include preheating of feed gas stream and heat recovery from the product gas stream. The shift reaction 4 may occur in the catalytic reactor. The product stream 40 from the CO shift system may include carbon dioxide, hydrogen, methane, carbon monoxide, nitrogen, argon, and water vapor. A typical $H_2$ content of stream 40 is 75% $H_2$ by volume.

The product stream 40 may flow to a second solid adsorber, $H_2$ PSA 2. The waste stream 38 may include hydrogen, carbon dioxide, carbon monoxide, methane, nitrogen, argon and water vapor. Substantially all of these components are separated from the hydrogen product stream 39. The $H_2$ PSA2 is a multi-bed system, with each bed containing layers of adsorbent designed to separate the contaminants from the hydrogen and maximize $H_2$ recovery. Adsorbents used include alumina, silica gel, active carbon, and/or zeolites.

A hydrogen stream 39 may be produced from the second solid adsorber. The hydrogen stream 39 may have less than 20 ppm of other components (e.g., impurities) and/or a pressure of at least approximately 60 bar. The hydrogen streams 14 and 39 from the first solid adsorber PSA1 and the second solid adsorber PSA2 may be combined to produce a high pressure hydrogen product stream. This high pressure hydrogen product stream may be utilized for delivery to a pipeline that supplies hydrogen for hydrogen vehicles and/or for other processes such as ammonia synthesis or hydro-treating hydrocarbons containing sulfur, for example.

The second solid adsorber may be regenerated to produce a fuel stream 38. The fuel stream 38 may be provided as part of the fuel for combustion in the fired heater burner. The remaining fuel requirement is provided by a natural gas stream 47.

A gas turbine may drive an air compressor, which may provide the feed air stream to the ASU. A portion of the feed stream (e.g., natural gas) 46 may be provided to the gas turbine as fuel. The gas turbine exhaust 17 may be at approximately 450° C. The gas turbine exhaust 17, which includes oxygen, may be provided as the combustion air stream for the fired heater burner.

The fired heater may heat a first part 23 of the feed stream (e.g., natural gas) to be provided to the POX. The first part 23 may be compressed, and the compressed first part 24 may be heated by the fired heater to produce a preheated feed stream 5 that is provided to the POX. The fired heater may also heat a second part 20 of the feed stream to be provided to the GHR.

The second part 20 may be compressed, and the compressed second part 21 may be heated in the fired heater to produce a preheated feed stream 22 to be provided to the GHR. Process water 42, together with saturated steam stream 31, may also be heated to produce multiple streams 44, 33, 32, and total superheated steam stream 34 of steam at 80 bar 500° C. for the process. The steam stream 34 splits into stream 35, used for preheating the $O_2$ feed to the POX or ATR and streams 36 and 37, stream 36, is added to stream 22 to produce the total feed gas steam 6 to the tube side of the GHR, and stream 37, includes the remaining high pressure superheated steam, which is passed through a condensing steam turbine coupled to an electric generator. Thus, through use of various streams for combustion and/or heat transfer, the thermal efficiency of the process may be greater than 60%. For example, the thermal efficiency of the process, based on the LHV of hydrogen product compared to total feed natural gas, may be greater than approximately 70% and can be above 75%.

Figure 4:
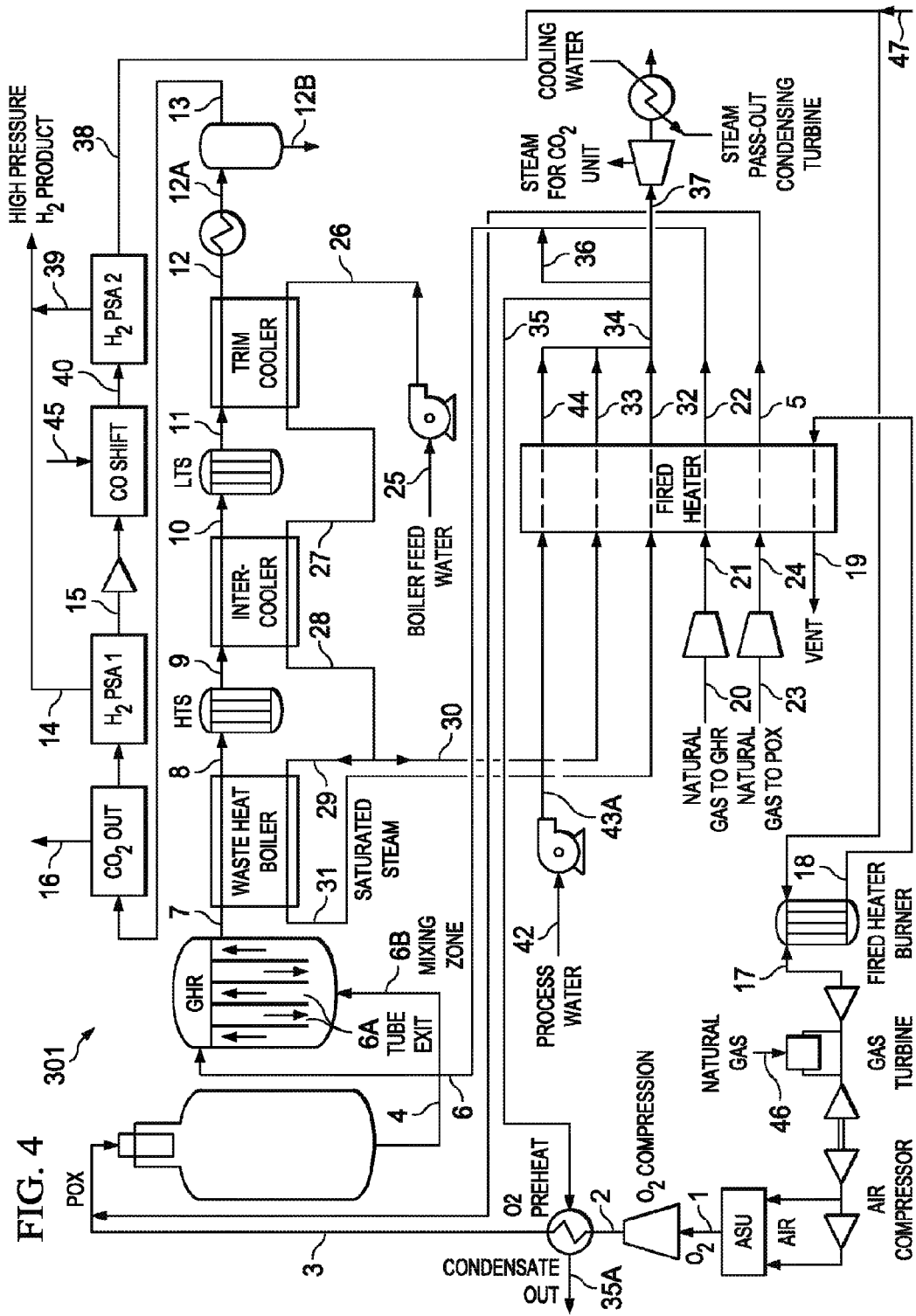
FIG. 4 illustrates feed stream compositions for an example of a feed stream being processed by the system illustrated in FIG. 2.

The tables illustrated in FIG. 4 illustrates the compositions flow rates and process conditions of the streams during an example of operation of the system 301 illustrated in FIG. 4. The hydrogen recovery in this example from the synthesis gas is approximately 97.8%. The carbon recovered as pure carbon dioxide in this example, compared with carbon in the natural gas feed, is approximately 81.9%. The thermal efficiency of the process based on the LHV of hydrogen product, compared to feed natural gas, is approximately 75.2%.

Although the system 201 described in FIG. 3 illustrates an implementation, various other implementations may be utilized in combination with processes, such as process 100, illustrated in FIG. 2. In addition, various components may be added, modified, and/or omitted. For example, the shift conversion of the compressed released component stream 15 is illustrated as a single shift system; however, the shift reactors may be single or multi-staged. In some implementations, the shift reactors may include high temperature and low temperature shift reactors and/or heat exchangers, as appropriate.

Although the above illustration includes various streams being heated and/or compressed, other streams may be heated and/or compressed and/or shown streams may not be heated and/or compressed, as illustrated.

Although a specific implementation of the system is described above, various components may be added, deleted, and/or modified. In addition, the various temperatures and/or concentrations are described for exemplary purposes. Temperatures and/or concentrations may vary, as appropriate.

A number of implementations have been described. Nevertheless, it will be understood that various modifications may be made without departing from the spirit and scope of the implementations. Accordingly, other implementations are within the scope of this application.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a reactor" includes a combination of two or more reactors and reference to "a feedstock" includes different types of feedstocks.

What is claimed is:

1. A method for producing ammonia comprising;
exothermically reacting a first portion of a hydrocarbon feed stream with an oxidant gas comprising molecular oxygen to produce an exothermically generated syngas product, wherein the step of reacting occurs in a partial oxidation reactor (POX) or an autothermal reforming reactor (ATR);
endothermically reforming a second portion of the hydrocarbon feed stream with steam over a catalyst in a heat exchange reformer to produce an endothermically-reformed syngas product, wherein at least a portion of heat used in generation of the endothermically-reformed syngas product is obtained by recovering heat from the exothermically-generated syngas product and the endothermically reformed syngas product;
combining the exothermically generated syngas product and the endothermically-reformed syngas product to produce a combined syngas stream
cooling the combined syngas stream to produce steam in a heat recovery boiler;
catalytically reacting the combined syngas stream in one or more catalytic carbon monoxide shift reactors to generate a shifted stream including additional $H_2$ and $CO_2$;
cooling the shifted stream to near ambient temperature in a heat exchanger by transferring heat to water for steam production in syngas generation;
removing $CO_2$ from the shifted syngas stream to produce a $CO_2$-depleted stream;
removing a high pressure, substantially pure $H_2$ stream from the $CO_2$-depleted stream, wherein the high pressure, substantially pure $H_2$ stream is produced independent of a compressor; and
combining the high pressure, substantially pure $H_2$ stream with a high pressure, substantially pure $N_2$ stream to produce ammonia.

2. The method of claim 1, wherein impurities included in the ammonia are about 50 parts per million (ppm) or less.

3. The method of claim 1, wherein the combined high pressure, substantially pure $H_2$ stream and high pressure, substantially pure $N_2$ stream have a pressure in a range about 100 to 300 bars.

4. The method of claim 1, wherein the high pressure, substantially pure $H_2$ stream comprises about 20 parts per million (ppm) by total volume of other components different than $H_2$.

5. The method of claim 1, wherein the high pressure, substantially pure $H_2$ stream has a pressure of about 60 bars or greater.

6. The method of claim 1, wherein the exothermically-generated syngas product is generated using a partial oxidation burner followed by a catalytic reforming section in a convectively heated steam plus hydrocarbon reformer.

7. The method of claim 1, wherein the feed stream includes methane.

8. The method of claim 1, wherein the $CO_2$ is removed using at least one of a conventional physical scrubbing process or a conventional chemical scrubbing process.

9. The method of claim 1, wherein the high pressure, substantially pure $H_2$ stream is separated from the CO2-depleted stream using one or more pressure swing adsorption systems.

10. The method of claim 9, wherein the one or more pressure swing adsorption systems comprises two pressure swing adsorption systems.

11. The method of claim 10, wherein $H_2$ produced from the two pressure swing adsorption systems are at substantially a same pressure.

12. The method of claim 9, wherein at least a portion of waste gas from the one or more pressure swing absorption systems is used as fuel for a gas turbine.

* * * * *

UNITED STATES PATENT AND TRADEMARK OFFICE
CERTIFICATE OF CORRECTION

| | |
|---|---|
| PATENT NO. | : 8,685,358 B2 |
| APPLICATION NO. | : 13/116952 |
| DATED | : April 1, 2014 |
| INVENTOR(S) | : Rodney J. Allam |

It is certified that error appears in the above-identified patent and that said Letters Patent is hereby corrected as shown below:

In the Claims:

In Column 14, Line 64 (approx.), In Claim 12, delete "absorption" and

Insert -- adsorption --, therefor.

Signed and Sealed this
Seventeenth Day of June, 2014

Michelle K. Lee
*Deputy Director of the United States Patent and Trademark Office*